No. 684,903. Patented Oct. 22, 1901.
I. BARKER.
TOOL CHUCK.
(Application filed Sept. 11, 1899.)
(No Model.)
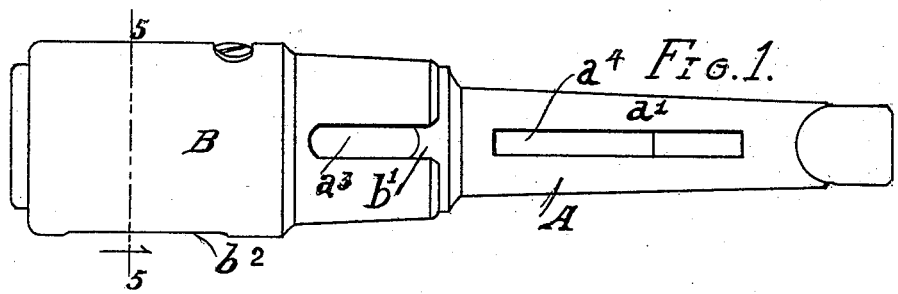
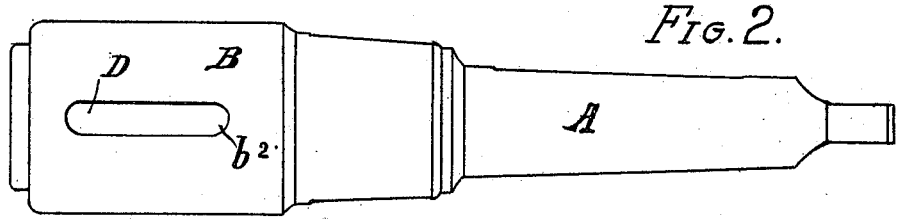
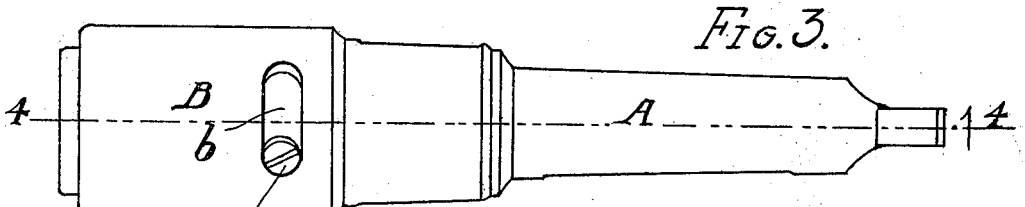
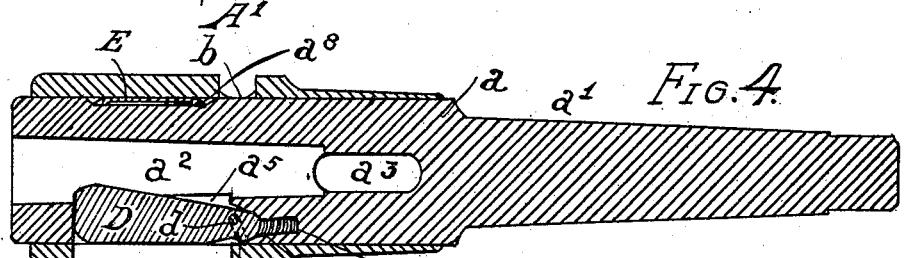
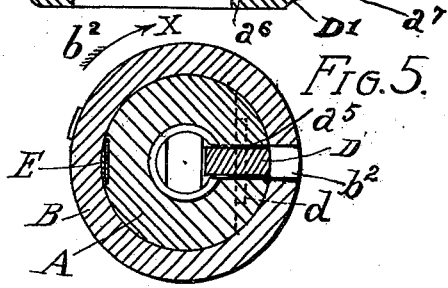
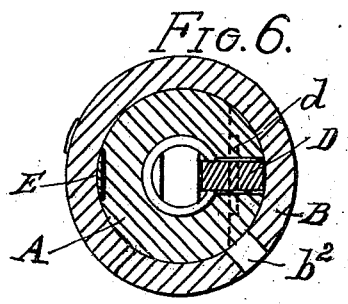
WITNESSES.
Frank Hudson
Annie Barnett
INVENTOR.
IRVING BARKER.
By Atty. N. DuBois.
THE NORRIS PETERS CO., PHOTO-LITHO., WASHINGTON, D. C.

UNITED STATES PATENT OFFICE.

IRVING BARKER, OF SPRINGFIELD, ILLINOIS, ASSIGNOR OF ONE-HALF TO EDWARD W. McCULLOUGH, OF SPRINGFIELD, ILLINOIS.

TOOL-CHUCK.

SPECIFICATION forming part of Letters Patent No. 684,903, dated October 22, 1901.

Application filed September 11, 1899. Serial No. 730,153. (No model.)

*To all whom it may concern:*

Be it known that I, IRVING BARKER, a citizen of the United States, residing at Springfield, in the county of Sangamon and State of Illinois, have invented certain new and useful Improvements in Tool-Chucks, of which the following is such a full, clear, and exact description as will enable others skilled in the art to which it appertains to make and use my said invention.

My invention relates to chucks of that class which are employed to hold drills or other tools used in boring, drilling, or analogous operations, and is a modification and improvement of the tool-chuck described in my United States Patent No. 591,088, dated October 5, 1897.

The purposes of my invention are to provide effective safeguards against injury to the chuck or the tool held therein by untimely attempts to drive the tool out of the chuck without releasing the retaining-latch, to provide means to prevent rattling or accidental turning of the sleeve, and to provide improved means for connecting the latch with the stock of the chuck.

With these ends in view my invention consists of the novel features of construction and combinations of parts shown in the annexed drawings, to which reference is hereby made, and hereinafter particularly described, and pointed out in the claims.

Referring to the drawings, Figure 1 is a right-hand side elevation. Fig. 2 is a rear elevation, and Fig. 3 a front elevation, of the chuck. Fig. 4 is a longitudinal axial section on the line 4 4 of Fig. 3. Fig. 5 is an enlarged transverse section on the line 5 5 of Fig. 1, all of the parts occupying the positions shown in Fig. 1; and Fig. 6 is also an enlarged transverse section on the line 5 5 of Fig. 1, the parts being shown in the relative positions which they occupy when the sleeve is turned so as to secure the latch and close the drift-slot.

Similar letters of reference designate like parts in all of the views.

The stock A has a cylindrical body part $a$ and a tapering shank $a'$. It also has an axial socket $a^2$, adapted to receive the shank of a tool usable with the chuck. The body of the stock is pierced by a transverse drift-slot $a^3$, through which a drift may be inserted to drive the tool out of the chuck in the usual well-known manner. The shank $a'$ preferably has a longitudinal channel $a^4$, suitable to receive the latch of a larger chuck of like kind, with which the chuck now being described may be used. A screw $A'$ on the stock serves to limit the turning of the sleeve on the stock. In the part $a$ is a longitudinal slot $a^5$. A latch D is mounted to oscillate in the slot $a^5$. An inclined cut or channel $a^6$ in the body $a$ and transverse to the slot $a^5$, as shown in the dotted lines in Fig. 4, accommodates a pin $d$, on which the latch D turns. A spring $D'$, housed in a recess $a^7$ in the stock, acts against the latch to press it inward, so that a part of the latch will extend into the socket, as shown in Fig. 5, in position to engage in a suitable longitudinal channel or way in the shank of a tool usable with the chuck. A cylindrical sleeve B fits closely around and is turnable to a limited extent on the body part $a$ of the stock A and has a peripheral slot $b$, in which the head of the screw $A'$ fits loosely, so that the sleeve may turn on the stock to an extent limited by the length of the slot. The head of the screw $A'$ in the slot $b$ also prevents longitudinal movement of the sleeve on the stock. The sleeve B also has two diametrically opposite longitudinal slots $b'$, which register with the drift-slot $a^3$ when the parts are in the relative positions shown in Figs. 1, 2, and 3. When the parts are in this position, a drift may be inserted through the registering slots $b'$ and $a^3$ for the purpose of driving the shank of the tool out of the socket of the chuck. The sleeve B also has a longitudinal slot $b^2$, which registers with the slot $a^5$ when the slot $b'$ is in registry with the slot $a^3$, but not at any other time. When the slots $b^2$ and $a^5$ are in registry, the latch can move into the slot $b^2$, so as to permit the withdrawal of the tool from the chuck. In all other positions of the parts the outer edge of the latch contacts with the inner surface of the sleeve, and the sleeve prevents outward movement of the latch. The tool can be withdrawn only when the slots $b^2$ and $a^5$ are in registry. When slots $b^2$ and $a^5$ are in registry, the slots $b'$ and $a^3$ are also in registry, so that when a drift is inserted through the slots $b'$ and $a^3$ the latch is free to move in the slots $b^2$ and $a^5$ and disengage the tool. When the sleeve is turned so as to cover the slot $a^3$, it is impossible to insert a drift or other instrument to drive out the tool. It will be seen then that the means which I have described absolutely prevent injury to the chuck or the tool by attempting to drive out the tool at a time when the latch is not in position to release the tool. When the slots $b'$ and $a^3$ are in registry, the end wall of the slot $b$ in the sleeve B abuts against the head of the screw A', as shown in Figs. 1 and 3, and prevents excessive turning of the sleeve. No particular care on the part of the user is required to bring the parts into position for the release of the tool, since the striking of the sleeve against the screw A' apprises him when the parts are in proper position. A dished spring E lies in a depression $a^8$ in the stock and presses against the inner surface of the sleeve with sufficient force to prevent rattling or accidental turning of the sleeve. When the sleeve is turned on the stock in the direction indicated by arrow X, Fig. 5, to bring the parts into the position shown in Fig. 6, the sleeve closes the slots $b'$ and $b^2$ and prevents outward movement of the latch and also prevents the insertion of any instrument into the drift-slot $a^3$.

I do not restrict my claims to the precise means shown and described for simultaneously covering or uncovering both ends of the drift-slot or the precise means for engaging or releasing the latch, as other equivalent devices—such as a sleeve slidable longitudinally on the stock to cover or uncover the drift-slot and having a longitudinal slot adapted to accommodate a latch and provided with means, such as a downwardly-inclined lug, adapted to engage with and push the latch inward—may be used without departing from my invention, it being essential only that the means for covering or uncovering the drift-slot shall have operative relation to the latch, substantially as set forth.

I am aware that an annular sleeve having a screw connection with and turnable on the stock of a tool-chuck, so that by turning the sleeve a number of times it may be unscrewed from the stock sufficiently to uncover a drift-slot, has been used. I therefore do not claim, broadly, an annular sleeve turnable to uncover a drift-slot, but restrict my claims to a slotted sleeve turnable to bring the slots therein in registry with the drift-slot through the stock.

Having fully described my invention, what I claim as new, and desire to secure by Letters Patent, is—

1. A sleeve for tool-chucks having a latch-slot and drift-slots, in combination with a stock having a tool-socket also having a latch-slot and a drift-slot simultaneously registrable with the latch-slot and the drift-slots of said sleeve, and a latch mounted to oscillate in said latch-slot; as set forth.

2. In a chuck the combination of a stock having a tool-socket and a latch-slot extending into said socket also having an inclined slot transverse to said latch-slot and a recess contiguous thereto, a pin turning in said inclined slot and supporting a latch, and a spring in said recess acting against the end of said latch; as set forth.

3. In a chuck the combination of a stock adapted to receive a tool and provided with a latch-slot and a drift-slot, with a turnable sleeve having a latch-slot and drift-slots, and means for stopping said sleeve with the slots in registry; as set forth.

4. In a chuck the combination of a stock having a socket and a transverse drift-slot, with a slot-closing device adapted to simultaneously cover or uncover both ends of the drift-slot through said stock, and a latch operative by said slot-closing device, as set forth.

5. In a chuck the combination of a stock having a socket and a transverse drift-slot, a slot-closing device, a latch operative by said slot-closing device, and means for limiting the movement of said slot-closing device, as set forth.

6. A drill or tool socket having a drift-slot, mechanism to lock the tool in the socket and means operatively connected with said mechanism to cover the ends of the drift-slot when the tool is locked, substantially as described.

7. A drill or tool socket having a drift-slot, a lock to engage the tool, a sleeve to secure the lock, and extensions on said sleeve to cover the ends of said slot in certain positions, substantially as described.

In witness whereof I have hereunto subscribed my name, at Springfield, Illinois, this 25th day of August, 1899.

IRVING BARKER.

Witnesses:
W. M. AYER,
JOHN I. RINCKER, Jr.